United States Patent
Zhou et al.

(10) Patent No.: US 10,381,671 B2
(45) Date of Patent: Aug. 13, 2019

(54) METHOD FOR REMOVING PENTAVALENT ANTIMONY CONTAMINANTS IN WATER AND FUEL CELL

(71) Applicant: PowerChina Huadong Engineering Coporation Limited, Hangzhou (CN)

(72) Inventors: Guowang Zhou, Hangzhou (CN); Rujun Tao, Hangzhou (CN); Guanglv Yu, Hangzhou (CN); Hao Yu, Hangzhou (CN); Xiaodong Lin, Hangzhou (CN)

(73) Assignee: PowerChina Huadong Engineering Corporation Limited, Hangzhou (CN)

( * ) Notice: Subject to any disclaimer, the term of this patent is extended or adjusted under 35 U.S.C. 154(b) by 186 days.

(21) Appl. No.: 15/622,054

(22) Filed: Jun. 13, 2017

(65) Prior Publication Data

US 2018/0115005 A1    Apr. 26, 2018

(30) Foreign Application Priority Data

Oct. 26, 2016    (CN) .......................... 2016 1 0943574

(51) Int. Cl.
*H01M 8/06* (2016.01)
*H01M 8/04* (2016.01)
(Continued)

(52) U.S. Cl.
CPC .......... *H01M 8/0693* (2013.01); *C02F 1/463* (2013.01); *C02F 1/4678* (2013.01); *H01M 4/926* (2013.01);
(Continued)

(58) Field of Classification Search
CPC ...... H01M 8/04; H01M 8/06; H01M 8/04119; H01M 4/92
See application file for complete search history.

(56) References Cited

U.S. PATENT DOCUMENTS

2009/0169962 A1* 7/2009 Hsing ................. H01M 4/8605
                                                      429/415
2011/0297552 A1* 12/2011 Boyle ..................... C02F 1/463
                                                      205/742

OTHER PUBLICATIONS

"Performance of a single chamber microbial fuel cell at different organic loads and pH values using purified terephthalic acid wastewater", Marashi et al., Journal of Environmental Health Science & Engineering, 13:27, p. 1-6, Apr. 10, 2015.*

(Continued)

*Primary Examiner* — Kenneth J Douyette
(74) *Attorney, Agent, or Firm* — Wayne & Ken, LLC; Tony Hom

(57) ABSTRACT

The present invention provides a method for removing pentavalent antimony contaminants in water without adding a DC power supply and also provides a fuel cell capable of removing the pentavalent antimony contaminants in water by utilizing self-generated electric energy. A technical solution of the present invention is as follows: waste water is pumped into a reactor for reaction after a pH value of the waste water containing the pentavalent antimony contaminants adjusted to 3-6.5; the inside of a reactor is an anaerobic environment; and an iron anode is arranged in the reactor, a through hole is formed in a side wall of the reactor, a cathode for reducing oxygen by electrons and protons sealed and inlaid in the through hole, and a resistor is connected between the iron anode and the cathode in series. The present invention is suitable for a water treatment technology.

10 Claims, 2 Drawing Sheets

(51) Int. Cl.

| | | |
|---|---|---|
| | *H01M 12/06* | (2006.01) |
| | *H01M 4/92* | (2006.01) |
| | *H01M 8/04119* | (2016.01) |
| | *C02F 1/463* | (2006.01) |
| | *C02F 1/467* | (2006.01) |
| | *C01G 30/00* | (2006.01) |
| | *C08F 14/26* | (2006.01) |
| | *C02F 1/461* | (2006.01) |
| | *C02F 101/10* | (2006.01) |
| | *C02F 101/20* | (2006.01) |

(52) U.S. Cl.
CPC ....... *H01M 8/04156* (2013.01); *H01M 12/06* (2013.01); *C01G 30/00* (2013.01); *C02F 2001/46142* (2013.01); *C02F 2101/10* (2013.01); *C02F 2101/20* (2013.01); *C02F 2201/009* (2013.01); *C02F 2209/06* (2013.01); *C08F 14/26* (2013.01)

(56) References Cited

OTHER PUBLICATIONS

"Electricity Generation from Petrochemical Wastewater Using a Membrane-Less Single Chamber Microbial Fuel Cell", Marashi et al., Second Iranian Conference on Renewable Energy and Distributed Generation, p. 23-27, 2012.*

"Investigation of Influencing Factors and Mechanism of Antimony and Arsenic Removal by Electrocoagulation Using Fe—Al Electrodes", Song et al., Industrial & Engineering Chemistry Research, 53, p. 12911-12919, Jul. 24, 2014.*

* cited by examiner

METHOD FOR REMOVING PENTAVALENT ANTIMONY CONTAMINANTS IN WATER AND FUEL CELL

FIELD OF THE INVENTION

The present invention relates to a method for removing pentavalent antimony contaminants in water and a fuel cell and is suitable for a water treatment technology.

BACKGROUND OF THE INVENTION

In recent years, a large number of poisonous heavy metal ions are contained in waste water discharged by industrial enterprises in China. A research hotspot in the technical field of water treatment is to effectively remove the heavy metal ions in the waste water. Antimony is a poisonous and harmful pollutant in water and has two existence forms: trivalent antimony and trivalent antimony, wherein the existence form of pentavalent antimony is more common. Compared with trivalent antimony, the pentavalent antimony has higher electronegativity and higher water solubility, which is difficult to be removed. At present, methods for removing antimony pollutants in water mainly include: an adsorption method, a coagulating precipitation method, an ion exchange method, etc. The above methods generally have better effect of removing the trivalent antimony, but are not effective in removing the pentavalent antimony.

An electrochemical method is an effective water purification technology, which is used for purifying the pollutants by an electrochemical reaction in the water and a single action or couple with other processes such as flocculation, precipitation, oxidation, reduction, etc. Authorized patents (201310059368.0 and 201310319985.X) and an application for patent (Application Number: 201510131879.8) disclose methods for removing pentavalent antimony by the electrochemical method. The pentavalent antimony is reduced to trivalent antimony by the electrochemical method, and then the trivalent antimony is removed by the combined action of adsorption, coagulation and coprecipitation. However, the patents need to add a DC (Direct Current) power supply for supplying power, thereby greatly increasing the treatment cost.

SUMMARY OF THE INVENTION

A technical problem to be solved by the present invention is to provide a method for removing pentavalent antimony contaminants in water without adding a DC power supply while considering the above problem.

The prevent invention also provides a fuel cell which is capable of removing the pentavalent antimony contaminants in water by utilizing self-generated electric energy.

The present invention adopts the technical solution as follows: the method for removing the pentavalent antimony contaminants in water comprises:

adjusting a pH value of waste water containing the pentavalent antimony contaminants to be treated to 3-6.5; and passing the adjusted waste water into a reactor for reaction;

the inside of the reactor is under anaerobic condition; and an iron anode is arranged in the reactor, a through hole is provided in a side wall of the reactor, a cathode for restoring oxygen by utilizing electrons and protons is sealed and inlaid in the through hole, and a resistor is connected between the iron anode and the cathode in series.

A catalyst layer, a current collection material layer, a carbon-based layer and a diffusion layer are sequentially arranged from one side of the cathode facing to the inside of the reactor to the side of the cathode opposite to the reactor.

The catalyst layer has platinum-carbon-loaded catalyst particles; the current collection material layer is a waterproof carbon cloth; the carbon-based layer is coated with carbon black powder; and the diffusion layer is coated with polytetrafluoroethylene.

A spacing between the iron anode and the cathode is 1-2 cm.

A fuel cell, comprising a reactor, wherein a water inlet for passing waste water containing pentavalent antimony contaminants to be treated is arranged at a lower part of the reactor, a water outlet for discharging the treated waste water is arranged at an upper part of the reactor, an iron anode is arranged in the reactor; a through hole is provided in the side wall of the reactor; a cathode for restoring oxygen by utilizing electrons and the protons is sealed and inlaid in the through hole, and a resistor is connected between the iron anode and the cathode in series.

A catalyst layer, a current collection material layer, a carbon-based layer and a diffusion layer are sequentially arranged from one side of the cathode facing to the inside of the reactor to the side of the cathode opposite to the reactor.

The catalyst layer has platinum-carbon-loaded catalyst particles; the current collection material layer is a waterproof carbon cloth; the carbon-based layer is coated with carbon black powder; and the diffusion layer is coated with polytetrafluoroethylene.

The inside of the reactor is under anaerobic condition.

A pH value of the waste water containing the pentavalent antimony contaminants and passing into the reactor to be treated is 3-6.5.

A spacing between the iron anode and the cathode is 1-2 cm.

In the reactor, the iron anode generates ferrous ions by the electrochemical dissolution reaction, and the pentavalent antimony irons are reduced to trivalent antimony irons by the ferrous ions under the acidic condition, so that the pentavalent antimony contaminants is purified and removed by the coprecipitation or coagulation of the trivalent antimony irons and ferric irons, and the reactions are shown as follows:

$$Fe \rightarrow Fe^{2+} + 2e^-$$

$$Sb^{3+} + 2Fe^{2+} \rightarrow Sb^{3+} + 2Fe^{3+}$$

$$Sb^{3+} + Fe^{3+} + 3H_2O \rightarrow Sb^{3+}Fe(OH)_3 + 3H^+$$

Oxygen is reduced to water by the reduction reaction of the cathode:

$$O_2 + 4H^+ + 4e^- \rightarrow 2H_2O$$

The beneficial effects of the present invention comprise: (1) electric energy is generated by a potential difference caused by the reaction of the iron anode and the cathode which restores the oxygen by utilizing electrons and the protons, and the electric energy can also be served as a power supply for electrocoagulation; and (2) the ferrous ions are generated by an electrochemical dissolution method of the iron anode, the pentavalent antimony ions is reduced to the trivalent antimony ions under the acidic condition, so that the pentavalent antimony contaminants in water can be effectively purified and removed by the coprecipitation or coagulation of the trivalent antimony irons and ferric irons.

In the figures: 1—water inlet, 2—water outlet, 3—iron anode, 4—cathode, 41—catalyst layer, 42—current collection material layer, 43—carbon-based layer, 44—diffusion layer, 5—resistor, and 6—reactor.

DETAILED DESCRIPTION OF THE INVENTION

Figure 1:
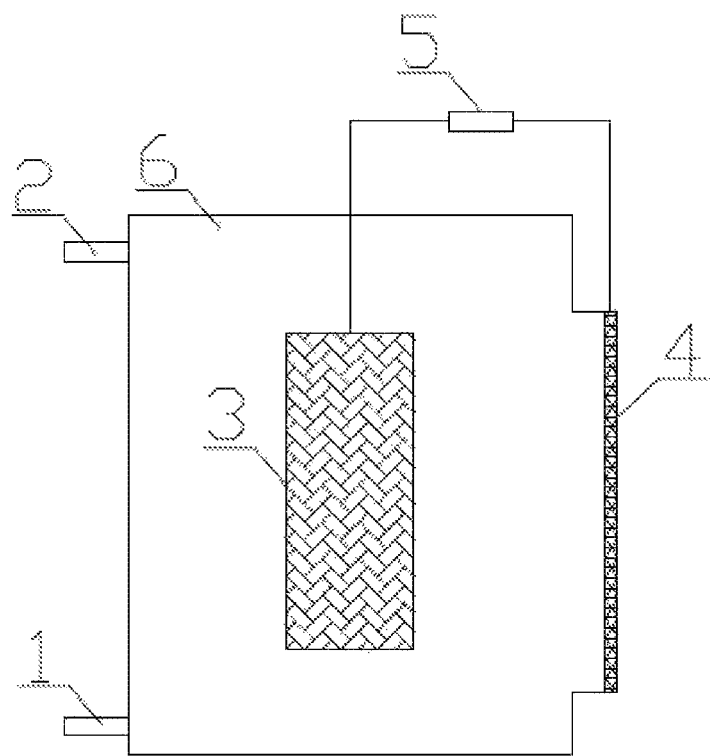
FIG. 1 is a structural schematic diagram of an embodiment.

As shown in FIG. 1, the present embodiment relates to a fuel cell, comprising a reactor 6, wherein the reactor 6 is under anaerobic condition, a water inlet 1 is arranged at a lower part of the reactor 6, a water outlet 2 is arranged at an upper part of the reactor 6, an iron anode 3 and a cathode 4 for restoring oxygen by utilizing electrons and protons are arranged in the reactor 6, and a resistor 5 is connected between the iron anode 3 and the cathode 4 in series. In the present embodiment, a through hole is provided in a side wall of the reactor 6, and the cathode 4 is sealed and inlaid in the through hole.

In the present embodiment, a spacing between the iron anode 3 and the cathode 4 is 1-2 cm, so that protons generated by the anode can be quickly transmitted to the cathode 4.

Figure 2:
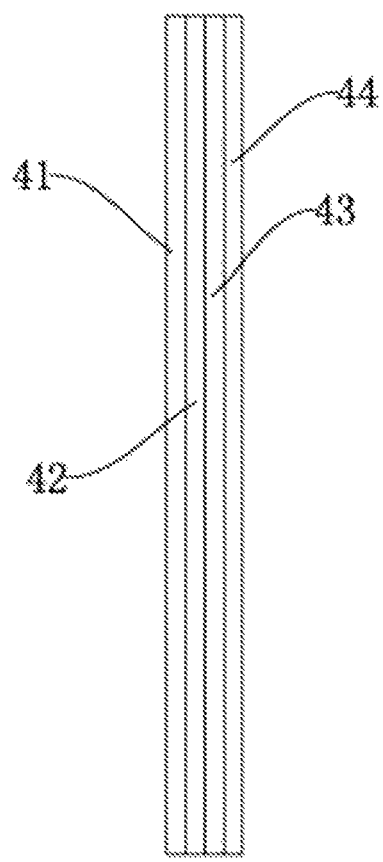
FIG. 2 is a structural schematic diagram of a cathode in the embodiment.

In the present embodiment, a catalyst layer 41, a current collection material layer 42, a carbon-based layer 43 and a diffusion layer 44 (as shown in FIG. 2) are sequentially arranged from one side of the cathode 4 facing to the inside of the reactor 6 to the side of the cathode 4 opposite to the reactor 6, wherein the catalyst layer is in contact with waste water in the reactor 6, and the catalyst in the catalyst layer is platinum-carbon-loaded catalyst particles; the current collection material layer can select waterproof carbon cloth as an electrode material; the carbon-based layer may be coated with carbon black powder to enhance the electrical conductivity of electrodes; and the diffusion layer may be coated with polytetrafluoroethylene, so that the water in the reactor 6 can be prevented from seeping on one hand, and on the other hand, the oxygen in outside air can be transmitted to a direction of the catalyst layer.

In the present embodiment, the cathode 4 is placed at a critical position of the air and the waste water in the reactor 6, so that an outer side of the cathode 4 can be in contact with the air, and an inner side of the cathode 4 can be in contact with the waste water in the reactor 6. Electrons generated by an electrochemical dissolution reaction of the iron anode 3 reach the cathode 4 through the external resistor 5; in addition, since the outer side of the cathode 4 is in contact with the air, the oxygen in the air can be transmitted to the inner side of the cathode 4. Therefore, the oxygen in the air is reduced to water by the electrons and the protons generated by the iron anode 3, and electric energy is finally generated.

In the present embodiment, the electric energy is generated by the potential difference caused by the reaction of the iron anode 3 and the cathode 4 which is used for reducing the oxygen by utilizing the electrons and the protons, and the electric energy can also be served as the power supply for electrocoagulation; and ferrous ions are generated by the electrochemical dissolution of the iron anode 3, pentavalent antimony ions are reduced to trivalent antimony ions under the acidic condition, so that the pentavalent antimony contaminants in water can be effectively purified and removed by the coprecipitation or coagulation of the trivalent antimony irons and ferric irons.

In the present embodiment, a working principle (i.e., a method for removing the pentavalent antimony contaminants in water) of the fuel cell is described as follows:

the pH value of waste water containing the pentavalent antimony contaminants to be treated is adjusted to 3-6.5. Preferably, the pH value of the waste water containing the pentavalent antimony contaminants to be treated is adjusted to 4.5, 5.6 or 6.5.

The waste water enters the reactor 6 from the water inlet 1, and is guided out of the reactor 6 through the water outlet 2 after treated in the reactor 6. The iron anode 3 generates ferrous ions by the electrochemical dissolution reaction, the pentavalent antimony ions are reduced to the trivalent antimony ions by the ferrous ions under the acidic condition, so that the pentavalent antimony contaminants is purified and removed by the coprecipitation or coagulation of the trivalent antimony irons and ferric irons, and the reactions are shown as follows:

$$Fe \rightarrow Fe^{2+} + 2e^-$$

$$Sb^{5+} + 2Fe^{2+} \rightarrow Sb^{3+} + 2Fe^{3+}$$

$$Sb^{3+} + Fe^{3+} + 3H_2O \rightarrow Sb^{3+}Fe(OH)_3 + 3H^+$$

wherein the electrons generated by the electrochemical dissolution reaction of the iron anode 3 reach the cathode 4 through the external resistor 5, and the protons generated by the reaction of the anode is directly transmitted to the cathode 4. Oxygen is reduced to water by the reduction reaction of the cathode 4, and a main reaction equation is described as follows:

$$O_2 + 4H^+ + 4e^- \rightarrow 2H_2O.$$

What is claimed is:

1. A fuel cell, comprising:
a reactor, wherein a water inlet for passing waste water containing pentavalent antimony contaminants to be treated is arranged at a lower part of the reactor;
a water outlet for discharging the treated waste water is arranged at an upper part of the reactor; an iron anode is arranged in the reactor; a through hole is provided in a side wall of the reactor; a cathode for restoring oxygen by utilizing electrons and protons is sealed and inlaid in the through hole; and a resistor is connected between the iron anode and the cathode in series; the inside of the reactor is under anaerobic condition;
the cathode comprises a catalyst layer, a current collection material layer, a carbon-based layer and a diffusion layer sequentially arranged from an inner side of the cathode to an outer side of the cathode; the diffusion layer is in contact with an outside air, and the catalyst layer is in contact with the waste water in the reactor.

2. The fuel cell of claim 1, wherein the catalyst layer has platinum-carbon-loaded catalyst particles; the current collection material layer is a waterproof carbon cloth; the carbon-based layer is coated with carbon black powder; and the diffusion layer is coated with polytetrafluoroethylene.

3. The fuel cell of claim 1, wherein a spacing between the iron anode and the cathode is 1-2 CM.

4. A method for removing pentavalent antimony contaminants in water using the fuel cell of claim 1, wherein the method comprises:

passing waste water containing the pentavalent antimony contaminants to be treated to the reactor for waste water treatment.

5. The method for removing pentavalent antimony contaminants in water of claim 4, wherein the inside of the reactor is under anaerobic condition.

6. The method for removing pentavalent antimony contaminants in water of claim 4, wherein a pH value of the waste water containing the pentavalent antimony contaminants and passing into the reactor to be treated is 3-6.5.

7. The method for removing pentavalent antimony contaminants in water of claim 4, wherein in the reactor, the iron anode generates ferrous ions by the electrochemical dissolution reaction, and the pentavalent antimony irons are reduced to trivalent antimony irons by the ferrous ions under the acidic condition, so that the pentavalent antimony contaminants is purified and removed by the coprecipitation or coagulation of the trivalent antimony irons and ferric irons.

8. The method for removing pentavalent antimony contaminants in water of claim 4, wherein in the reactor, electric energy is generated by a potential difference caused by the reaction of the iron anode and the cathode by coupling the iron anode with the cathode, and the electric energy is utilized to remove pentavalent antimony contaminants.

9. The fuel cell of claim 1, wherein a pH value of the waste water containing the pentavalent antimony contaminants is 3-6.5.

10. The fuel cell of claim 1, wherein in the reactor, the iron anode generates ferrous ions by an electrochemical dissolution reaction, and pentavalent antimony ions are reduced to trivalent antimony ions by the ferrous ions under an acidic condition, so that the pentavalent antimony contaminants are purified and removed by coprecipitation or coagulation of the trivalent antimony ions and ferric ions.

* * * * *

UNITED STATES PATENT AND TRADEMARK OFFICE
CERTIFICATE OF CORRECTION

PATENT NO. : 10,381,671 B2
APPLICATION NO. : 15/622054
DATED : August 13, 2019
INVENTOR(S) : Guowang Zhou et al.

It is certified that error appears in the above-identified patent and that said Letters Patent is hereby corrected as shown below:

On the Title Page

Item (72) The spelling of the given name of inventor Guanglv YU is incorrect. It should be Guanglu YU.

Signed and Sealed this
Seventeenth Day of March, 2020

Andrei Iancu
*Director of the United States Patent and Trademark Office*